US011880038B2

(12) United States Patent
King et al.

(10) Patent No.: US 11,880,038 B2
(45) Date of Patent: Jan. 23, 2024

(54) HYBRID VEHICLE PROJECTOR

(71) Applicant: Ford Global Technologies, LLC, Dearborn, MI (US)

(72) Inventors: Anthony Gerald King, Ann Arbor, MI (US); Agnieszka Zielonka, Ypsilanti, MI (US); Rafal Golab, Ortonville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 183 days.

(21) Appl. No.: 17/581,023

(22) Filed: Jan. 21, 2022

(65) Prior Publication Data

US 2023/0236419 A1    Jul. 27, 2023

(51) Int. Cl.
*G02B 27/01* (2006.01)
*B60K 35/00* (2006.01)

(52) U.S. Cl.
CPC .......... *G02B 27/0103* (2013.01); *B60K 35/00* (2013.01); *B60K 2370/1529* (2019.05); *B60K 2370/29* (2019.05); *B60K 2370/334* (2019.05)

(58) Field of Classification Search
CPC ............ G02B 27/0101; G02B 27/0103; B60K 35/00; B60K 2370/1529; B60K 2370/334
See application file for complete search history.

(56) References Cited

U.S. PATENT DOCUMENTS

| 10,859,826 | B2 | 12/2020 | Hayakawa et al. |
| 11,127,216 | B2 | 9/2021 | Cappuccilli et al. |
| 2021/0231949 | A1 | 7/2021 | Koborinai |

FOREIGN PATENT DOCUMENTS

| CN | 112673300 A | 4/2021 |
| EP | 894509 A1 | 7/2015 |

*Primary Examiner* — Ryan D Howard
(74) *Attorney, Agent, or Firm* — Frank Lollo; Bejin Bieneman PLC

(57) ABSTRACT

A hybrid projector apparatus for a vehicle includes a heads-up display (HUD) projector disposed in a housing that includes a transparent area. The hybrid projector apparatus includes a holographic optical elements (HOE) projector supported by and at least partly exterior to the housing and is arranged to project light through the transparent area.

16 Claims, 9 Drawing Sheets

HYBRID VEHICLE PROJECTOR

BACKGROUND

Vehicles typically include various displays to provide users with a variety of information. For example, vehicles can include instrument panels to provide a vehicle operator with data about a vehicle's speed, fuel status, engine temperature, etc. A vehicle can include a touchscreen display or the like to provide a variety of information and accept user input, e.g., for a climate control system, an audio system, etc. Yet further, a vehicle can include a heads-up display or the like to display information to be viewed by a vehicle operator or other user in combination with the user's view of a vehicle windshield and/or a roadway.

DETAILED DESCRIPTION

Figure 1:
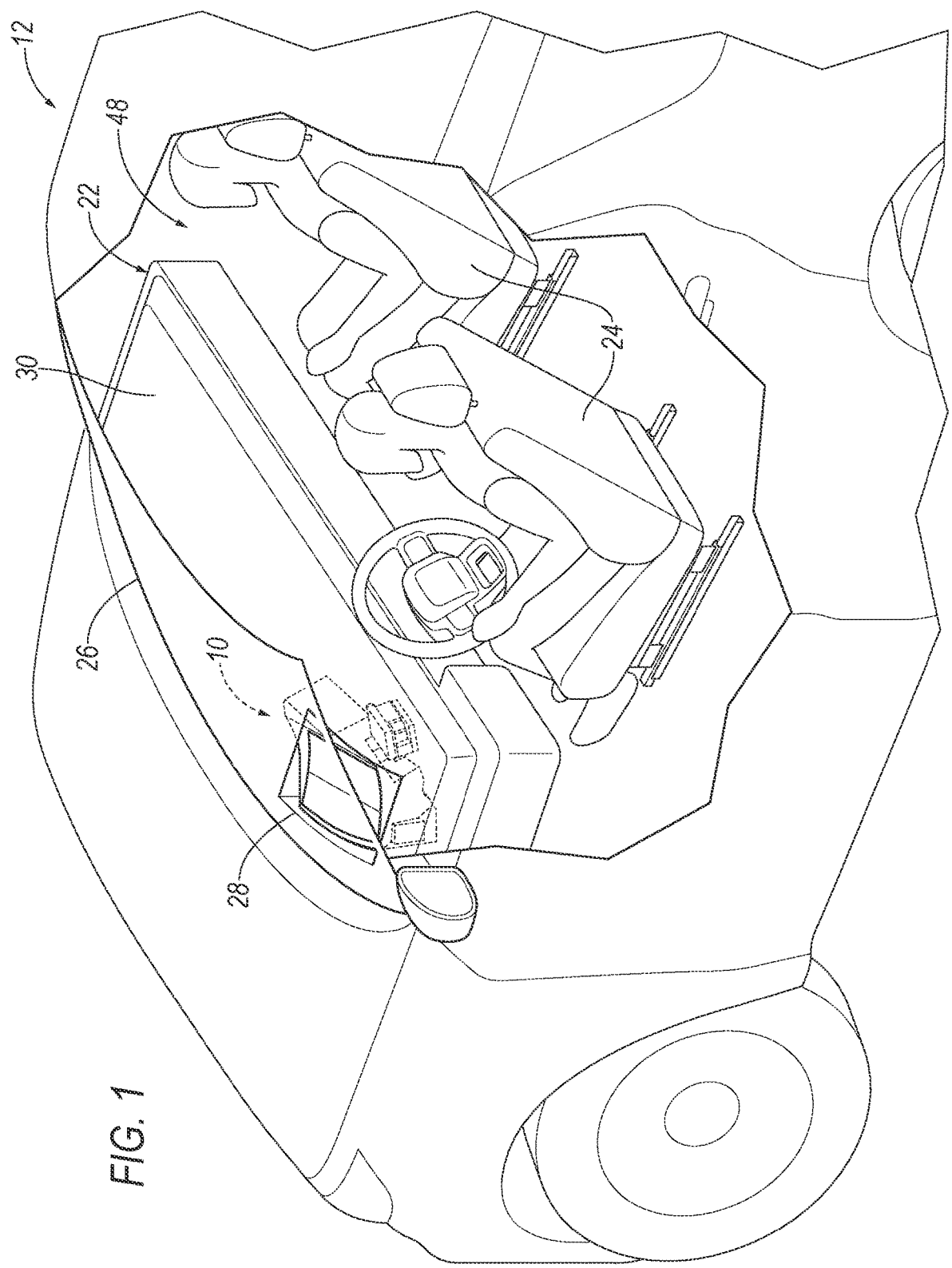
FIG. 1 is a perspective view of a vehicle having a hybrid projector that includes a heads-up display (HUD) projector and a holographic optical elements (HOE) projector.

A hybrid projector apparatus for a vehicle includes a heads-up display (HUD) projector disposed in a housing that includes a transparent area and a holographic optical elements (HOE) projector supported by and at least partly exterior to the housing and is arranged to project light through the transparent area.

The HUD projector may be supportable by an instrument panel of the vehicle.

The instrument panel may define an opening aligned with the transparent area of the housing.

The HUD projector may be arranged to project light through the transparent area of the housing.

The HUD projector and the HOE projector may be arranged to provide respective images that overlap one another.

An image by the HUD projector may be projected at a first distance from an occupant of the vehicle and an image by the HOE projector may be projected at a second distance from the occupant of the vehicle. The first distance may be farther than the second distance.

The HOE projector may be aimed at a windshield of the vehicle.

The windshield may include a photopolymer film, the HOE projector being aimed at the photopolymer film.

The HOE projector may be arranged to project light toward the photopolymer film.

The HUD projector and the HOE projector may be each arranged to display images in a field of view of an occupant of the vehicle.

The HOE projector may be removably supported by the housing of the HUD projector.

The housing may define a hole in a side opposite the transparent area, the HOE projector being removably supported by the opening in the side.

The hole may be elongated along an axis, and the HOE projector is insertable into the hole along the axis.

The HOE projector may be rotatable within the hole about the axis.

With reference to the Figures, wherein like numerals indicate like parts throughout the several views, a hybrid projector apparatus 10 for a vehicle 12 includes a heads-up display (HUD) projector 14 disposed in a housing 16 that includes a transparent area 18. The hybrid projector 10 includes a holographic optical elements (HOE) projector 20 supported by and at least partly exterior to the housing 16. The HOE projector 20 is arranged to project light through the transparent area 18. Thus, as described herein, the HUD and HOE projectors 14, 20 can be advantageously packaged to be disposed in a vehicle instrument panel.

The HUD projector 14 and the HOE projector 20 can be used to display content such as information about the vehicle 12 and/or the surroundings of the vehicle 12 to an occupant of the vehicle 12. The projectors 14, 20 project images onto a windshield 26 of the vehicle 12. The HUD projector 14 can provide content as images that appear to be exterior and forward of the vehicle 12 along the roadway, and the HOE projector 20 can provide images that appear to be on the windshield 26, i.e., closer to the occupant than the HUD projector 14 images. Thus, the projectors 14, 20 can display the images in a manner to allow the occupant to view the images while also viewing a roadway along which the vehicle 12 is moving.

Supporting the HOE projector 20 by, and at least partly exterior to, the housing 16 of the HUD projector 14 allows the HOE projector 20 to be positioned to project light through the transparent area 18. The HOE projector 20 and the HUD projector 14 may provide respective projections that in turn result in respective images 32, 38, at different times and/or at a same time, to provide information to vehicle 12 occupants, e.g., about the surroundings of the vehicle 12 and/or the operation of the vehicle 12. Further, the HOE projector 20 being supported by the HUD projector 14 as described herein allows the projectors 14, 20, to be compactly and efficiently packaged and positioned in the vehicle 12 while ensuring that the projections of images 32, 38 do not interfere with one another.

With reference to FIG. 1, the vehicle 12 may be any suitable type of automobile, e.g., a passenger or commercial automobile such as a sedan, a coupe, a truck, a sport utility, a crossover, a van, a minivan, a taxi, a bus, etc.

The vehicle defines a passenger compartment 48 to house occupants, if any, of the vehicle 12. The passenger compartment 48 may extend across the vehicle 12, i.e., from one side to the other side of the vehicle 12. The passenger compartment 48 includes a front end and a rear end with the front end being in front of, i.e., forward of, the rear end during forward movement of the vehicle 12.

The vehicle 12 may include an instrument panel 22 disposed at a vehicle-forward end of the passenger compartment 48. The instrument panel 22 may include or support vehicle controls, for example, a touchscreen display, radio controls, climate control nobs, etc. The instrument panel 22 may extend across the front end of the passenger compartment 48 from one side of the vehicle 12 to the other side of the vehicle 12.

With continued reference to FIG. 1, the vehicle 12 may include one or more seats 24. Specifically, the vehicle 12 may include any suitable number of seats 24. The seats 24 are supported by a vehicle 12 floor (not numbered). The seats 24 may be arranged in any suitable arrangement in the passenger compartment 48. As in the example shown in the Figures, one or more of the seats 24 may be at the front end of the passenger compartment 48, e.g., a driver seat 24 and/or a passenger seat 24. In other examples, one or more of the seats 24 may be behind the front end of the passenger compartment 48, e.g., at the rear end of the passenger compartment 48. The seats 24 may be movable relative to the vehicle 12 floor to various positions, e.g., movable fore-and-aft and/or cross-vehicle. The seat 24 may be of any suitable type, e.g., a bucket seat.

The vehicle 12 may include a windshield 26 disposed at the front end of the passenger compartment 48 and extending above the instrument panel 22. The windshield 26 may extend from one side of the vehicle 12 to the other side of the vehicle 12. The windshield 26 may extend from the roof to the instrument panel 22. The windshield 26 may face in a forward direction from the passenger compartment 48. The windshield 26 may be any suitably transparent material, including glass such as laminated, tempered glass or plastic.

The vehicle 12 includes the hybrid projector 10 supportable by the instrument panel 22 of the vehicle 12. The hybrid projector 10 may be supported at any suitable location in a cross-vehicle location along the instrument panel 22 to position the projectors 14, 20 to display content in a vehicle-forward direction. For example, the hybrid projector 10 may be supported vehicle-forward of a steering wheel of the vehicle 12. The hybrid projector 10 can be situated at any suitable lateral position along the instrument panel 22, e.g., at a left side (when facing forward) of a center axis of the vehicle 12, at a right side of the center axis of the vehicle 12, e.g., on the center axis, etc.

To allow images 32, 38 to be projected from the projectors 14, 20 installed at least partly in the instrument panel 22, a top surface 30 of the instrument panel can define an opening 28. The hybrid projector 10 can then be positioned in the instrument panel 22 to allow light to pass through the opening 28 and vehicle-forward of the occupant. In other words, the hybrid projector 10 may be supported below the opening 28 such that light from the hybrid projector 10 may pass through the opening 28 and be aimed at the windshield 26. The hybrid projector 10 may be supported by the instrument panel in any suitable way, e.g., fasteners, press-fit latches, adhesive, etc.

Both the HUD projector 14 and the HOE projector 20 can be arranged to display images in a field of view of an occupant, such as an operator, passenger, or any combination thereof, of the vehicle 12. In other words, the HUD projector 14 and the HOE projector 20 can display images in the line of sight of one or more occupants of the vehicle 12. The HUD projector 14 and the HOE projector 20 can both be arranged to display images vehicle-forward of the occupant(s) to provide information about vehicle surroundings, vehicle operations, etc., via images 32, 38. Further, the HUD projector 14 and the HOE projector 20 could be arranged to display respective images to different occupants, e.g., the HUD projector 14 could be arranged to display a first image to a first occupant in a driver's seat, and the HOE projector 20 could be arranged to display a second image to a second occupant in a front passenger seat, or vice-versa. Alternatively or additionally, only one but not both of the projectors 14, 20 could be used at a time, i.e., the hybrid projector apparatus 10 can be configured such that one of the HUD projector 14 and the HOE projector 14 provides an image while the other does not. For example, the HOE projector 20 could be arranged and used to provide an image to a passenger occupant, e.g., in a front passenger seat, while the HUD projector 14 is not displaying an image.

Figure 2:
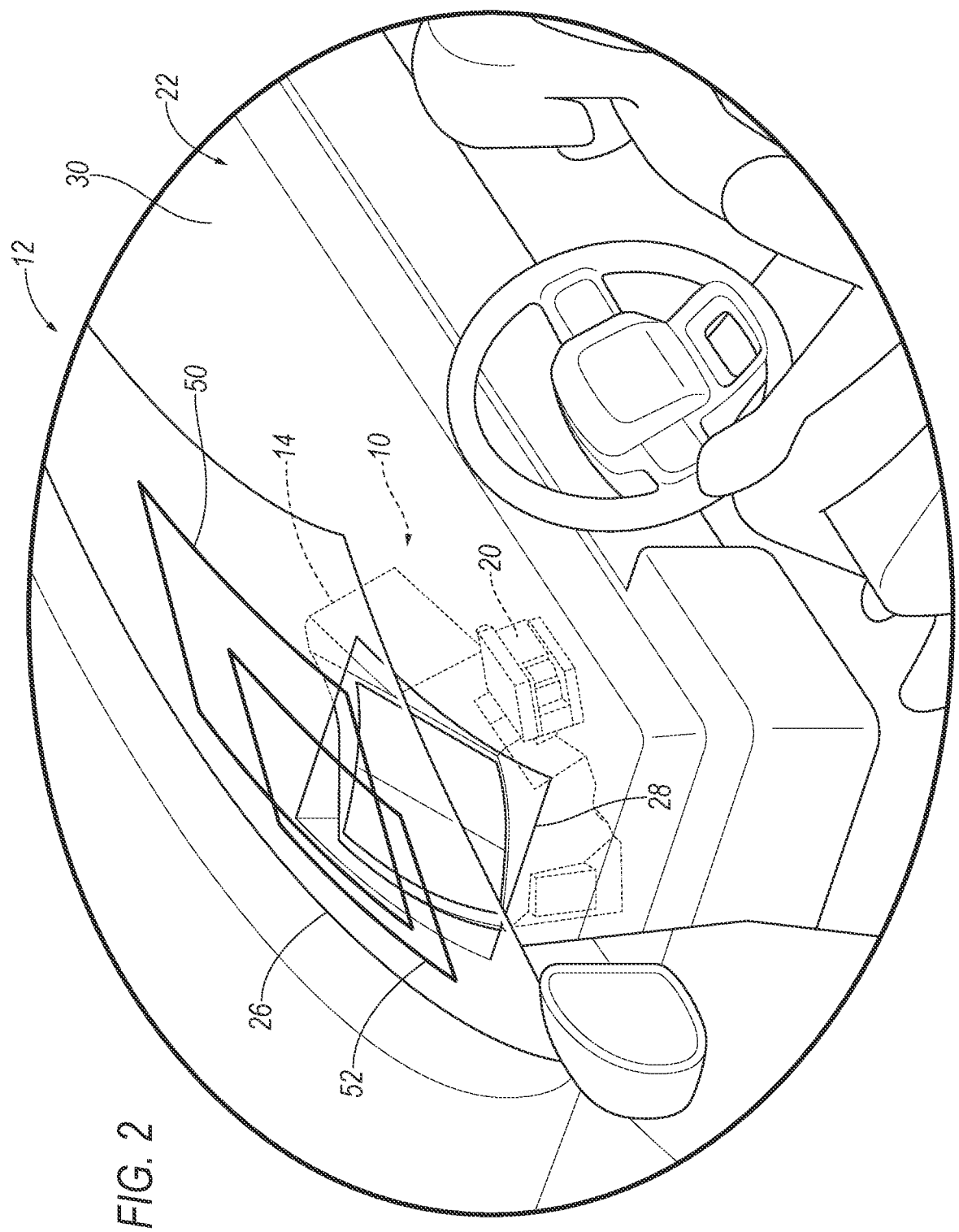
FIG. 2 is a side view of the vehicle of FIG. 1 illustrating the HUD projector and the HOE projector.

As best seen in FIG. 2, the HUD projector 14 may project light onto the windshield 26 to provide a HUD image 32 that can appear to an occupant to be exterior to the vehicle 12. The HUD projector 14 typically projects a HUD projection 50 onto the windshield 26, which results in the image 52. The HUD projection 50 may be a mirrored (i.e., reverse) image of the HUD image 32. The HUD projection 50 is reflected by the windshield 26 to provide the HUD image 32 in the line of sight of the occupant in its unreversed state so as to be viewable by and understood by the occupant. Although the HUD image 32 is projected onto the windshield 26, as discussed above, the HUD image 32 appears to the occupant(s) to be exterior to vehicle 12, e.g., to provide an augmented reality display of surroundings of the vehicle 12.

The HOE projector 20 is supported by the HUD projector 14. The HOE projector 20, like the HUD projector 14, is arranged to project light through the transparent area 18 of the HUD projector 14. The HOE projector 20 can provide an HOE image 38 that can include a display of an image or images that appears nearer to the occupant than the HUD images 32. The HOE projector 20 includes a lens (not numbered) directed toward the windshield 26 of the vehicle 12. The lens of the HOE projector 20 typically projects a HOE projection 52 onto the windshield 26. The HOE projection 52 may be a mirrored (i.e., reverse) image of the HOE image 38. The HOE projection 52 is reflected by the windshield 26 to provide the HOE image 38 in the line of sight of the occupant in its unreversed state so as to be viewable by and understood by the occupant.

The windshield 26 may include a photopolymer film arranged to receive the HOE projection 52 on the windshield 26 (thereby resulting in the image 38). The light from the projection 52 may be reflected by photopolymer film making the HOE image 38 visible to occupant. The photopolymer film may be any suitable material such that the HOE projection 52 may be reflected by the photopolymer film. For example, the photopolymer film may be RGB light sensitive for recording volume holograms. The photopolymer film may, for example, be between layers of polyvinyl butyral ("PVB") and glass of the windshield 26. The HOE image 38 may include, for example, vehicle measurements and information about the operation of the vehicle 12, e.g., speedometer, odometer, tachometer, fuel status, turn-by-turn navigation instructions, etc.

Figure 3:
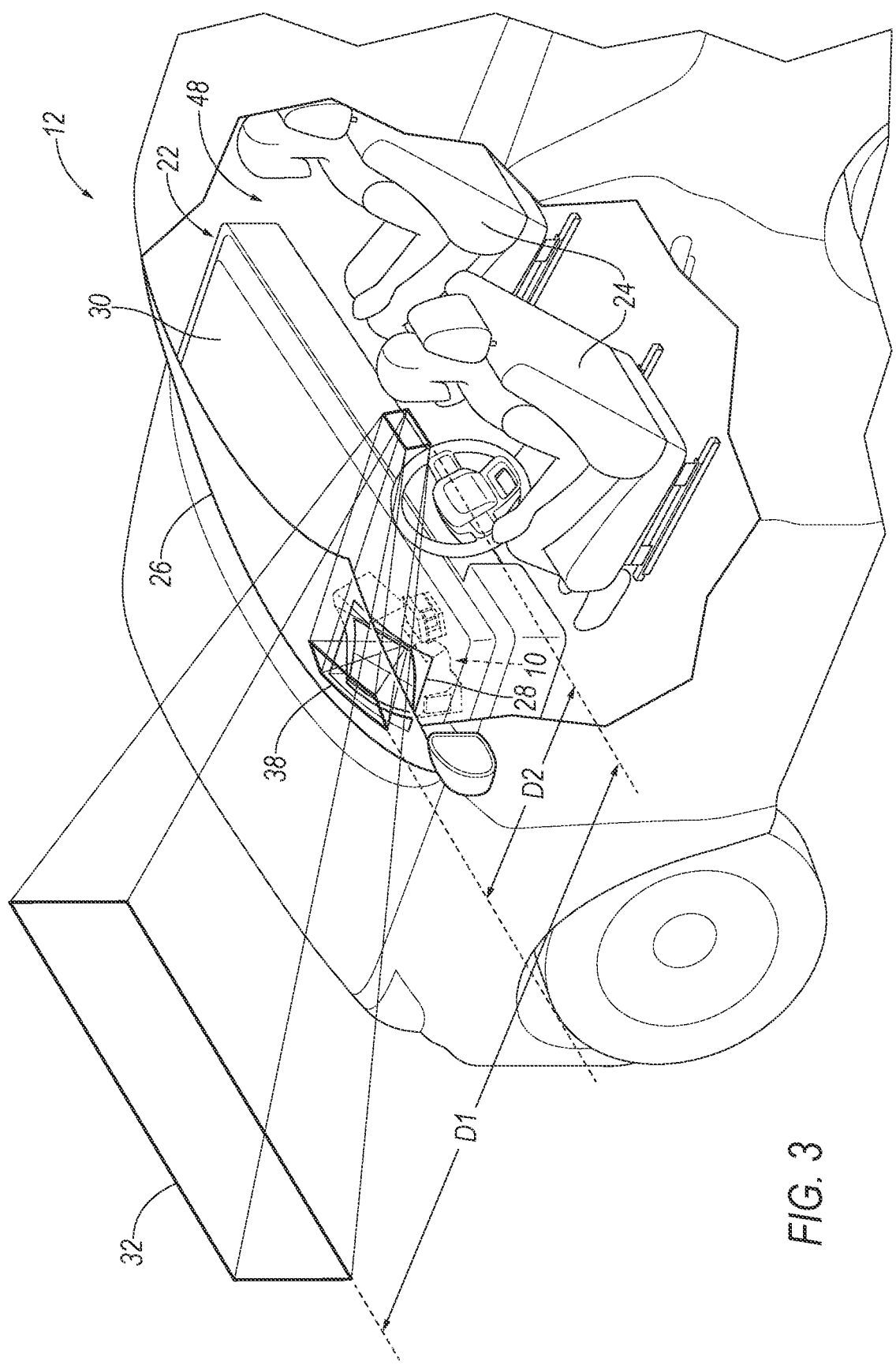
FIG. 3 is a perspective view of the vehicle illustrating a HUD image and a HOE image forward of the vehicle.

As seen in FIG. 3, the HUD image 32 may appear as if at a first distance D1 from an occupant or some other point of the vehicle 12, e.g., exterior to the vehicle 12 at a position forward from the vehicle 12. The HOE image 38 may appear as if at a second distance D2 from an occupant of the vehicle 12. The first distance D1 will appear to an occupant to be different from the second distance D2. The first distance D1 appears farther than the second distance D2. In other words, the HUD image 32 typically appears farther away from the occupant of the vehicle 12 than the HOE image 38. For example, the HOE image 38 may appear to be on the windshield 26 while the HUD image 32 appears at the first distance D1 exterior to the vehicle 12 as discussed above.

Figure 4:
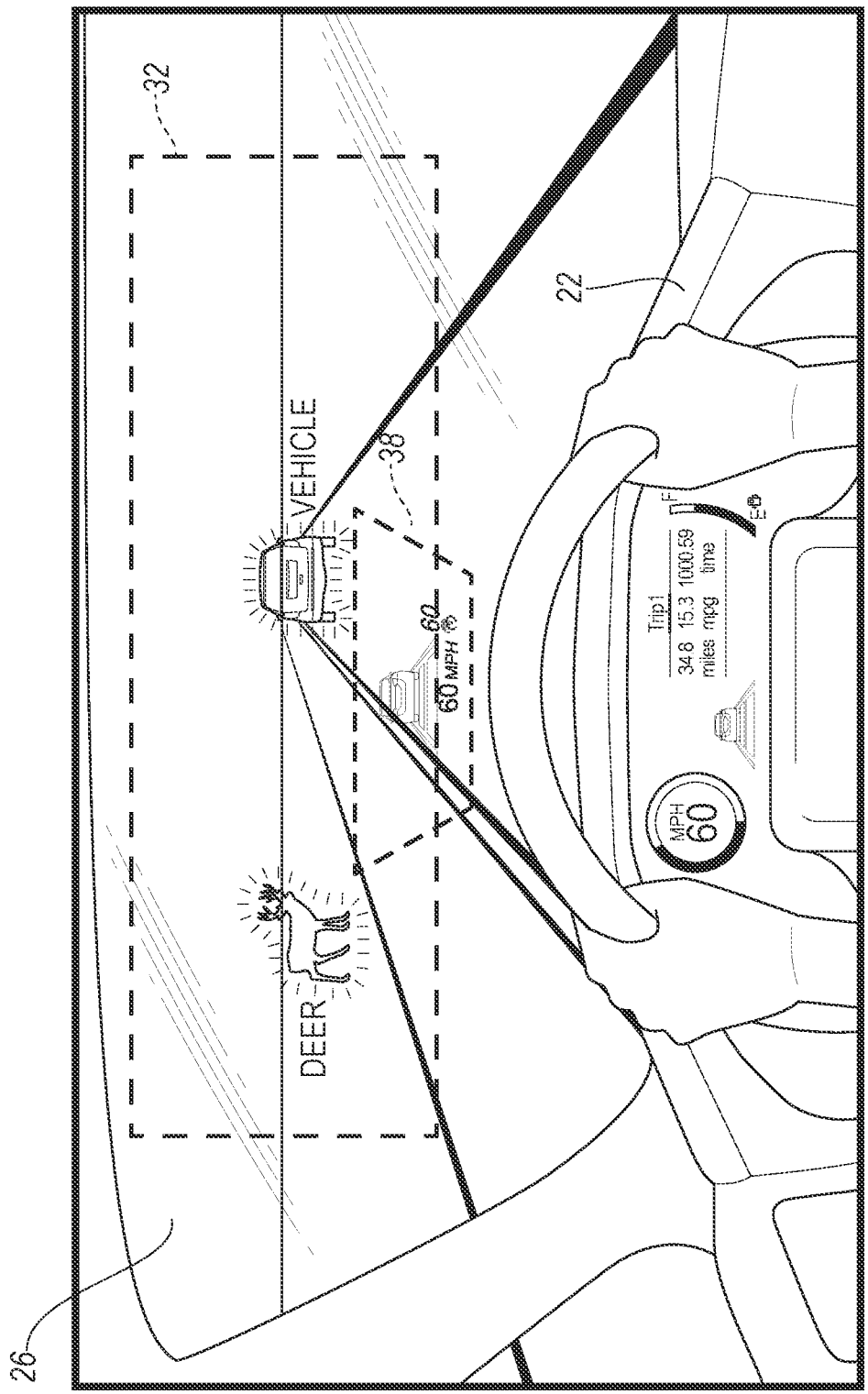
FIG. 4 is view of an example roadway on which the vehicle is driving illustrating an example HUD image and an example HOE image.

FIG. 4 illustrates an example view from inside the vehicle 12 of a roadway on which the vehicle 12 is driving. The example view of FIG. 4 shows the HUD image 32 and the HOE image 38 as would be seen by an occupant of the vehicle 12, for example, a driver. The HUD image 32 may indicate to the occupant the presence of objects in view of the HUD image 32. In the example shown in FIG. 4, the HUD image 32 indicates an animal on the left side of the roadway and a second vehicle ahead of the vehicle 12. The objects may be indicated in any suitable way. For example, the objects may be indicated by lights, colors, or verbiage within the HUD image 32, i.e., the animal is lit up in the HUD image 32 and is indicated by the word "DEER" and the vehicle is lit up in the HUD image 32 and is indicated by the word "VEHICLE." The HOE image 38, which appears as if on the windshield 26, indicates the speed of the vehicle 12 as well as any other vehicle operation information as described herein.

As shown in the example of FIG. 4, the HUD projector 14 and the HOE projector 20 are arranged to provide respective images 32, 38 that overlap one another. In this context, "overlap" means that at least a portion of the HOE image 38 extends over the HUD image 32. In other words, the respective images 32, 38 may both appear to the occupant at the same time. The HUD projector 14 and the HOE projector 20 may project each respective projection 32, 38 simultaneously through the transparent area 18 of the housing 16, as discussed above. Thus, an occupant of the vehicle 12 may see both the HUD image 32 and the HOE image 38 at the same time.

Figure 5:
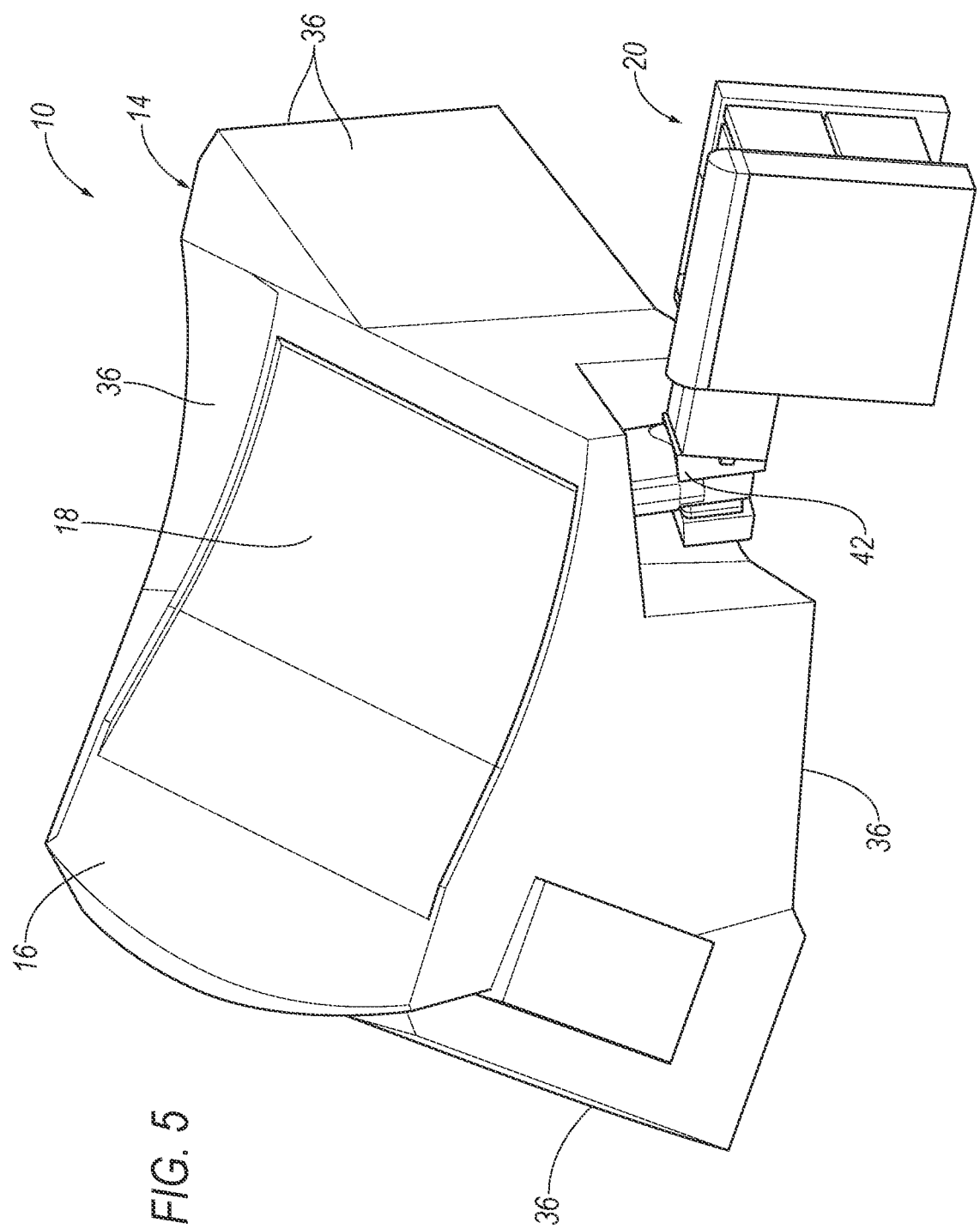
FIG. 5 is a perspective view of the hybrid projector of FIG. 1.

With reference to FIG. 5, the HUD projector 14 includes the housing 16. The housing 16 may house interior components of the HUD projector 14. The housing 16 includes a plurality of sides 36 defining the outermost boundary of the HUD projector 14. The sides 36 of the housing 16 may be formed of any suitable material such as plastic, metal, etc.

A top side 36 of the housing 16 includes the transparent area 18. The transparent area 18 is typically less than the entire area of the top side 36, i.e., a size and/or shape of the transparent area is determined to allow projections 50, 52 to pass through the transparent area 18. The transparent area 18 may be of any suitable material that is transparent, i.e., allows lights such as projections 50, 52 to pass therethrough. For example, the transparent area 18 may be glass, clear plastic, etc. The HUD projector 14 is arranged to project light through the transparent area 18 of the housing 16. The transparent area 18 may be aligned with the opening 28 in the instrument panel 22. The HUD projection 52 may pass through the transparent area 18 of the housing 16 and through the opening 28 of the instrument panel 22 to project onto the windshield 26.

The HOE projector 20 is supported by the housing 16 of the HUD projector 14, e.g., by a side 36 of the housing 16 that is opposite the top side 36 of the housing 16. Alternatively, the HOE projector 20 could be supported by any suitable side 36 of the housing 16 such that the HOE projector 20 may project the HOE image 38 through the transparent area 18.

The HOE projector 20 may be removably supported by, i.e., removable from, the housing 16 of the HUD projector 14. The HOE projector 20 being removable from the housing 16 allows the HUD projector 14 to be installed in the vehicle 12 without the HOE projector 20 or with the HOE projector 20. The HOE projector 20 may be supported by the housing 16 in any suitable way, e.g., using fasteners, e.g., screws, bolts, etc. In other examples, the HOE projector 20 may be supported by the housing 16 using press-fit latches. In such examples, the fasteners or latches may be loosened to allow the HOE projector 20 to be removed from the housing 16.

Figure 6:
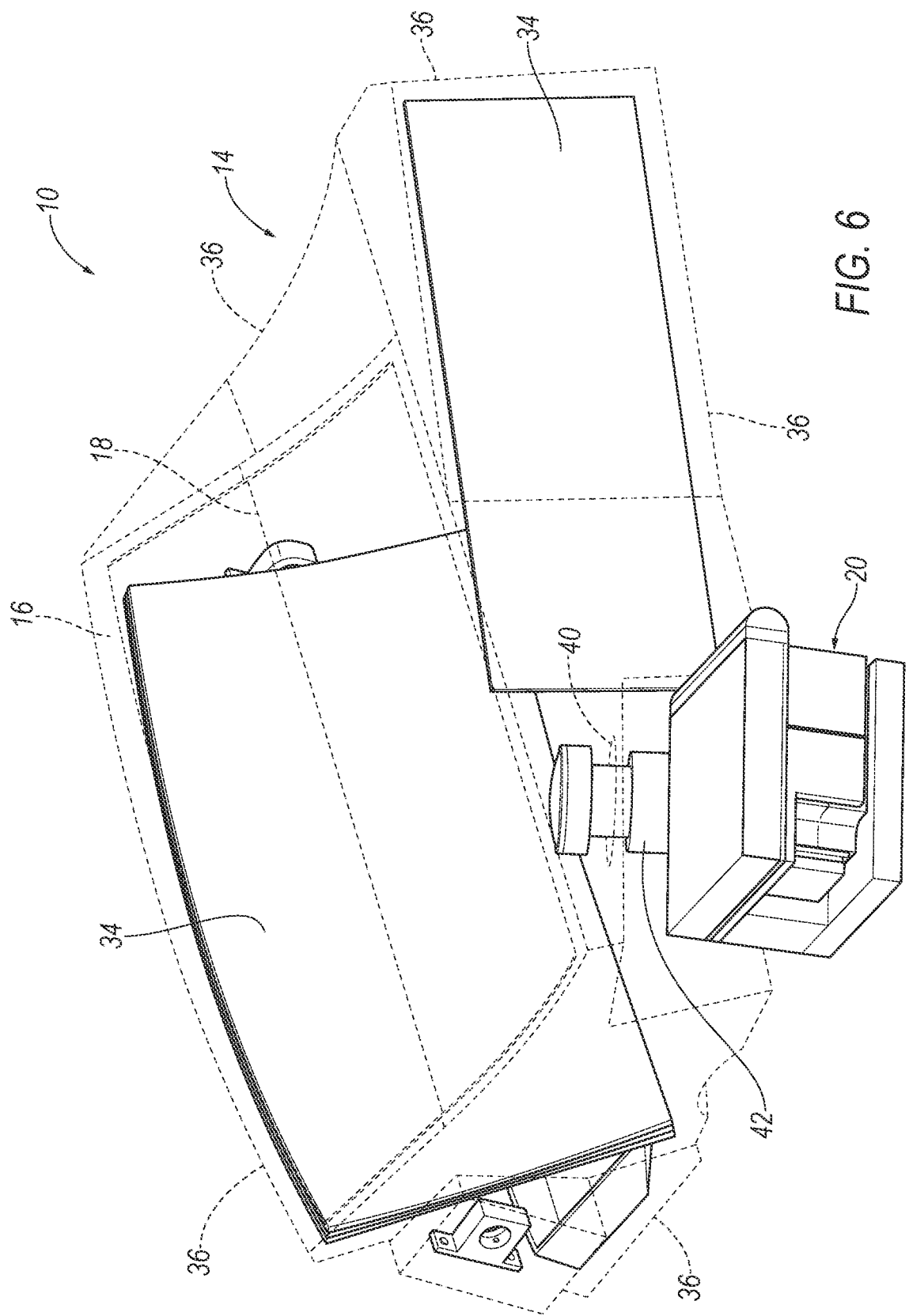
FIG. 6 is a perspective view of the hybrid projector of FIG. 1 with example internal components of the HUD projector shown.

With reference to FIG. 6, the HOE projector 20 is supported by the housing 16 at least partly exterior to the housing 16. In other words, the HOE projector 20 may include a portion interior to the housing 16 and a portion exterior to the housing 16. The housing 16 of the HUD projector 14 defines a hole 40 in one of the sides 36. In the example shown in FIG. 5, the hole 40 is in the side 36 of the housing 16 that is opposite the transparent area 18. In other examples, the hole 40 may be defined by any suitable side 36 of the housing 16 such that the HOE projector 20 projects through the transparent area 18. The hole 40 is arranged to receive the HOE projector 20. In other words, the HOE projector 20 is insertable into the hole 40. For example, the HOE projector 20 may include a protrusion 42 that is insertable into the hole 40 in the side 36 of the housing 16. In such an example, the portion of the protrusion 42 that is inserted into the hole 40 is the portion of the HOE projector 20 that is interior to the housing 16 and the remaining portions of the HOE projector 20 are exterior to the housing 16.

Figure 7:
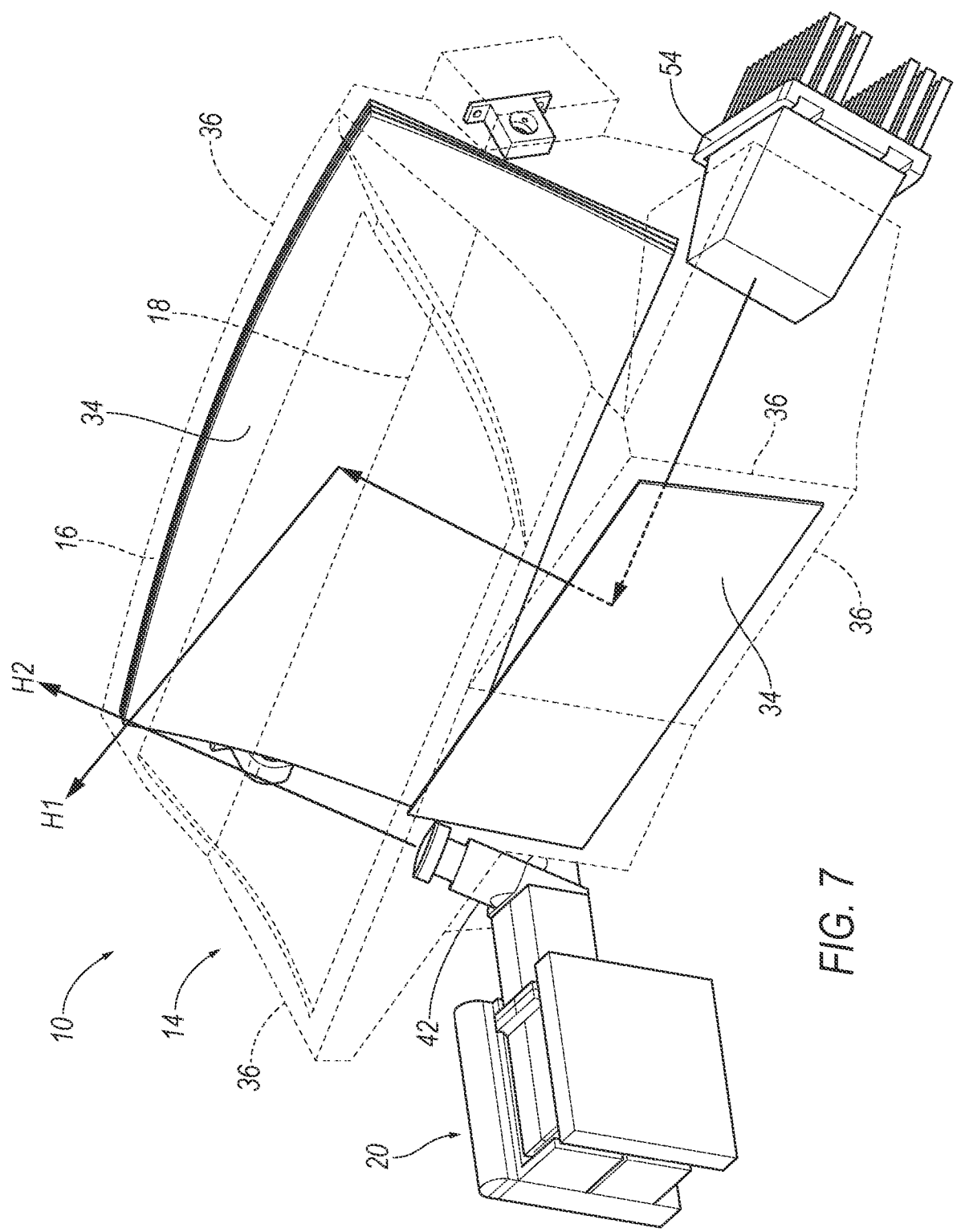
FIG. 7 is a perspective view of the hybrid projector of FIG. 1 with example light paths of the HUD projector and the HOE projector.

With reference to FIG. 7, the HUD projector 14 includes one or more mirrors 34 that can receive a HUD projection 50 from a light source 54 of the HUD projector 14. The housing 16 typically supports the mirrors 34 and the light source 54. The mirrors 34 may be housed inside the housing 16 while the light source 54 may be supported at least partially exterior to the housing 16.

The light source 54 may include a lens (not numbered) directed toward one or more of the mirrors 34. The mirrors 34 are positioned to project the HUD image 32 onto the windshield 26 in the line of sight of the occupant. In other words, the configuration of mirrors 34 and light source 54 may be arranged such that the HUD projection 50 follows a HUD light path H1. For example, as illustrated in FIG. 7, the HUD light path H1 is directed from the light source 54 toward a first mirror 34. The HUD projection 50 is reflected by the first mirror 34 and directed toward a second mirror 34. The HUD projection 50 is reflected by the second mirror 34 and directed toward the transparent area 18. The HUD projection 50 may pass through the transparent area 18. In other words, the HUD projection 50 follows the HUD light path H1 through the transparent area 18 and onto the windshield 26.

The first distance D1, i.e., the distance between the occupant and the location at which the HUD image 32 appears, may be adjusted or changed based on angles of the mirrors 34. The adjustment of the mirrors 34 may change the location upon which the HUD projection 50 appears along the windshield 26. The first distance D1 may change based on the change in location of the HUD projection 50 on the windshield 26. In other words, the first distance D1 may appear nearer or farther from the occupant of the vehicle 12 based on the adjustment of the mirrors 34. In some examples, angles of the mirrors 34 may be changed by any suitable mechanism (not shown), such as a motor and linkage, for example. In such an example, the mechanism may be housed in the housing 16 with the mirrors 34 and the light source 54. In other examples, the mirrors 34 may be adjusted manually, e.g., by a technician, to provide the HUD image 32 at the appropriate first distance D1.

As discussed above, the HOE projector 20 is arranged to direct the HOE projection 52 toward and onto the windshield 26 of the vehicle 12. The HOE projector 20 may be arranged such that the HOE projection 52 follows a HOE light path H2 directed toward the windshield 26. The HOE light path H2 extends through the transparent area 18 of the housing 16 onto the windshield 26.

Figure 8:
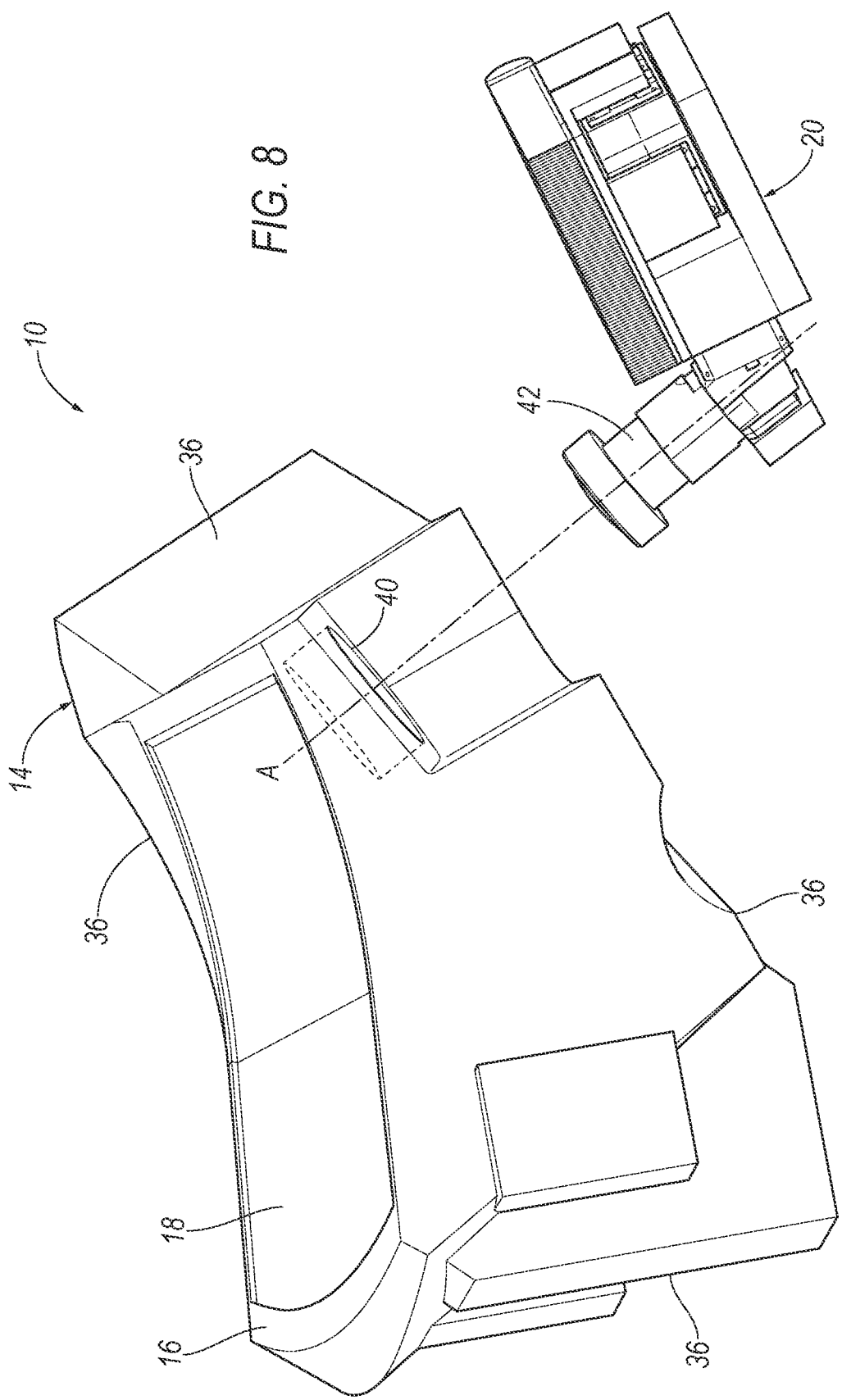
FIG. 8 is a side view of a hybrid projector with the HOE projector disconnected.

Turning now to FIG. 8, the hole 40 is elongated along an axis A. In other words, the protrusion 42 of the HOE projector 20 is insertable into the hole 40 along the axis A. The protrusion 42 may be supported by the housing 16 within the hole 40. The HOE projector 20 is removably supported at the hole 40. The HOE projector 20 may be removable along the axis A from the hole 40. Depending on the installation of the HOE projector 20, the HOE light path H2 (seen in FIG. 7) may extend along the axis A (seen in FIG. 8).

The HOE projector 20 is rotatable within the hole 40 about the axis A. The protrusion 42 may be rotatable about the axis A within the hole 40. The HOE projector 20 may be rotated within the hole 40 to allow for installation of the hybrid projector 10 in the instrument panel 22. The HOE projector 20 may rotate within the hole 40 to allow for the HOE projector 20 to be rotated to a plurality of locations. The plurality of locations allow for the HOE projector 20 to be installed in different designs or configurations of instrument panels 22. Additionally, the plurality of locations allow the HOE projector to be installed when the instrument panel 22 may have any design variation.

The HOE projector 20 may be rotatable within the hole 40 in any suitable way. For example, the hybrid projector 10 may include a motor (not shown) that may rotate the HOE projector 20. In such an example, the motor may be in communication with a vehicle computer 44 to rotate the HOE projector 20 to a desired location for the HOE image 38 to be projected on the windshield 26. In other examples, the HOE projector 20 may be rotated manually, e.g., by a technician or manufacturing employee, to emit a projection 52 to project the HOE image 38 on the desired location of the windshield 26.

Figure 9:
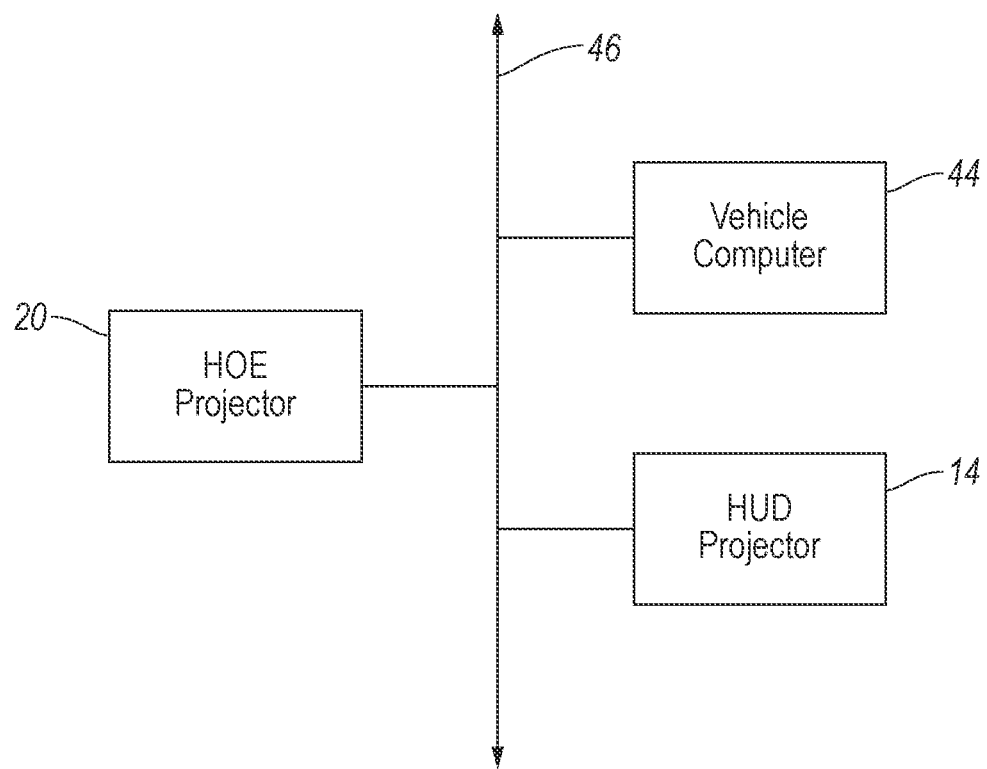
FIG. 9 is a block diagram of a vehicle communication network.

With reference to FIG. 9, the vehicle includes the vehicle computer 44 includes a processor and a memory. The memory includes one or more forms of computer readable media, and stores instructions executable by the vehicle computer 44 for performing various operations, including as disclosed herein. For example, a vehicle computer 44 can be a generic computer with a processor and memory as described above and/or may include an electronic control unit ECU or controller for a specific function or set of functions, and/or a dedicated electronic circuit including an ASIC that is manufactured for a particular operation, e.g., an ASIC for processing sensor data and/or communicating the sensor data. In another example, the vehicle computer 44 may include an FPGA (Field-Programmable Gate Array) which is an integrated circuit manufactured to be configurable by a user. Typically, a hardware description language such as VHDL (Very High-Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included in a computer.

The memory can be of any type, e.g., hard disk drives, solid state drives, servers, or any volatile or non-volatile media. The memory can store the collected data sent from the sensors. The memory can be a separate device from the vehicle computer 44, and the vehicle computer 44 can retrieve information stored by the memory via a network in the vehicle 12, e.g., over a CAN bus, a wireless network, etc. Alternatively or additionally, the memory can be part of the vehicle computer 44, e.g., as a memory of the vehicle computer 44.

The vehicle computer 44 may include programming to operate one or more of vehicle 12 brakes, propulsion e.g., control of acceleration in the vehicle 12 by controlling one or more of an internal combustion engine, electric motor, hybrid engine, etc., steering, climate control, interior and/or exterior lights, etc., as well as to determine whether and when the vehicle computer 44, as opposed to a human operator, is to control such operations. Additionally, the vehicle computer 44 may be programmed to determine whether and when a human operator is to control such operations. The vehicle computer 44 may include or be communicatively coupled to, e.g., via a vehicle network such as a communications bus as described further below, more than one processor, e.g., included in components such as sensors, electronic control units (ECUs) or the like included in the vehicle 12 for monitoring and/or controlling various vehicle components, e.g., a powertrain controller, a brake controller, a steering controller, etc.

With continued reference to FIG. 9, the vehicle computer 44 is generally arranged for communications on a vehicle communication network 46 that can include a bus in the vehicle 12 such as a controller area network CAN or the like, and/or other wired and/or wireless mechanisms. Alternatively or additionally, in cases where the vehicle computer 44 actually comprises a plurality of devices, the vehicle communication network 46 may be used for communications between devices represented as the vehicle computer 44 in this disclosure. Further, as mentioned below, various controllers and/or sensors may provide data to the vehicle computer 44 via the vehicle communication network 46.

The vehicle computer 44 may be in communication with the hybrid projector 10 over the vehicle communication network 46. The vehicle computer 44 may instruct the HUD projector 14 and the HOE projector 20 to show the images 32, 38 relating to the surroundings of the vehicle 12 and vehicle operating information, respectively. The vehicle computer 44 may be in communication with other components that may be in communication with the HUD projector 14 and the HOE projector 20 to show desired measurements or features to the occupant of the vehicle 12 when the vehicle 12 is in use. For example, in the case of the HUD projector 14, the HUD image 32 may include information about the surrounding of the vehicle 12 and, in the case of the HOE projector 20, the HOE image 38 may indicate vehicle operations and information as discussed above.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A hybrid projector apparatus for a vehicle, comprising:
   a heads-up display (HUD) projector disposed in a housing that includes a transparent area; and
   a holographic optical elements (HOE) projector supported by and at least partly exterior to the housing and is arranged to project light through the transparent area.

2. The hybrid projector apparatus of claim 1, wherein the HUD projector is supportable by an instrument panel of the vehicle.

3. The hybrid projector apparatus of claim 2, wherein the instrument panel defines an opening aligned with the transparent area of the housing.

4. The hybrid projector apparatus of claim 1, wherein the HUD projector is arranged to project light through the transparent area of the housing.

5. The hybrid projector apparatus of claim 1, wherein the HUD projector and the HOE projector are arranged to provide respective images that overlap one another.

6. The hybrid projector apparatus of claim 1, wherein an image by the HUD projector is projected at a first distance from an occupant of the vehicle and an image by the HOE projector is projected at a second distance from the occupant of the vehicle, the first distance being farther than the second distance.

7. The hybrid projector apparatus of claim 1, wherein the HOE projector is aimed at a windshield of the vehicle.

8. The hybrid projector apparatus of claim 7, wherein the windshield includes a photopolymer film, the HOE projector being aimed at the photopolymer film.

9. The hybrid projector apparatus of claim 8, wherein the HOE projector is arranged to project light toward the photopolymer film.

10. The hybrid projector apparatus of claim 1, wherein the HUD projector and the HOE projector are each arranged to display images in a field of view of an occupant of the vehicle.

11. The hybrid projector apparatus of claim 1, wherein the HOE projector is removably supported by the housing of the HUD projector.

12. The hybrid projector apparatus of claim 1, wherein the housing defines a hole in a side opposite the transparent area, the HOE projector being removably supported by the hole in the side.

13. The hybrid projector apparatus of claim 12, wherein the hole is elongated along an axis, and the HOE projector is insertable into the hole along the axis.

14. The hybrid projector apparatus of claim 13, wherein the HOE projector is rotatable within the hole about the axis.

15. The hybrid projector apparatus of claim 1, wherein the HUD projector is arranged to display a first image to a first occupant in a driver's seat, and the HOE projector is arranged to display a second image to a second occupant in a front passenger seat.

16. The hybrid projector apparatus of claim 1, configured such that one of the HUD projector and the HOE projector provides an image while the other does not.

* * * * *